US010586338B2

(12) United States Patent
Ekin

(10) Patent No.: US 10,586,338 B2
(45) Date of Patent: Mar. 10, 2020

(54) APPARATUS FOR DETERMINING POSITIONS OF AN INTERVENTIONAL INSTRUMENT IN A PROJECTION IMAGE

(71) Applicant: KONINKLIJKE PHILIPS N.V., Eindhoven (NL)

(72) Inventor: Ahmet Ekin, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 15/526,879

(22) PCT Filed: Nov. 23, 2015

(86) PCT No.: PCT/EP2015/077297
§ 371 (c)(1),
(2) Date: May 15, 2017

(87) PCT Pub. No.: WO2016/083275
PCT Pub. Date: Jun. 2, 2016

(65) Prior Publication Data
US 2017/0358091 A1 Dec. 14, 2017

(30) Foreign Application Priority Data
Nov. 27, 2014 (EP) .................................. 14195188

(51) Int. Cl.
G06T 7/168 (2017.01)
G06F 17/18 (2006.01)
(Continued)

(52) U.S. Cl.
CPC .......... G06T 7/168 (2017.01); G06F 3/04845 (2013.01); G06F 17/18 (2013.01);
(Continued)

(58) Field of Classification Search
CPC .......... G06T 7/168; G06T 2207/30021; G06T 2207/10116; G06T 2207/20101; G06F 3/04845; G06F 17/18
See application file for complete search history.

(56) References Cited

U.S. PATENT DOCUMENTS 7,772,541 B2  8/2010 Froggatt et al.
9,031,186 B2  5/2015 Nambu
(Continued)

OTHER PUBLICATIONS

Brost, A. et al., "3-D Respiratory Motion Compenstion during EP Procedures by Image-Based 3-D Lasso Catheter Model Generation adn Tracking". MICCAI 2009, Part I, pp. 394-401.
(Continued)

Primary Examiner — Bobbak Safaipour

(57) ABSTRACT

The invention relates to a positions determination apparatus for determining positions, at which an interventional instrument (3) is located, in a projection image. An input unit (16) allows a user to indicate the position of a tip (23) of the interventional instrument (3) in the projection image, wherein the positions, at which the interventional instrument is located, in the projection image are determined based on the projection image, the indicated tip position and a three-dimensional representation of the interventional instrument, which is defined by its position and shape as determined by a tracking device like an OSS device. By using the projection image, the indicated tip position and the representation the positions in the projection image, at which the interventional instrument is located, can be determined very accurately. Based on these determined positions the projection device and the tracking device can be very accurately registered to each other.

11 Claims, 9 Drawing Sheets

(51) Int. Cl.
*G06F 3/0484* (2013.01)
*G06T 7/246* (2017.01)

(52) U.S. Cl.
CPC .... *G06T 7/246* (2017.01); *G06T 2207/10116* (2013.01); *G06T 2207/20101* (2013.01); *G06T 2207/30021* (2013.01)

(56) References Cited

U.S. PATENT DOCUMENTS

| | | |
|---|---|---|
| 10,354,410 B2 * | 7/2019 | Bertrams .............. G06T 7/33 |
| 2003/0181809 A1 | 9/2003 | Hall |
| 2008/0009714 A1 * | 1/2008 | Oda .................. A61B 5/065 |
| | | 600/424 |
| 2008/0095421 A1 | 4/2008 | Sun et al. |
| 2010/0202727 A1 | 8/2010 | Prisco |
| 2013/0030363 A1 | 1/2013 | Wong et al. |
| 2013/0345719 A1 | 12/2013 | Donhowe |
| 2014/0114180 A1 | 4/2014 | Jain et al. |
| 2014/0187949 A1 | 7/2014 | Zhao et al. |
| 2016/0206381 A1 * | 7/2016 | Grass ................ A61B 5/066 |

OTHER PUBLICATIONS

Franci, A.F. et al., "Multiscale vessel enhancement filtering", Medical Image Computing and Computer-Assisted Intervention (MICCAI), Lecture Notes in Computer Science, vol. 1496, pp. 130-137 (1998).

* cited by examiner

APPARATUS FOR DETERMINING POSITIONS OF AN INTERVENTIONAL INSTRUMENT IN A PROJECTION IMAGE

CROSS-REFERENCE TO PRIOR APPLICATIONS

This application is the U.S. National Phase application under 35 U.S.C. § 371 of International Application Serial No. PCT/EP2015/077297, filed on Nov. 23, 2015, which claims the benefit of European Patent Application No. 14195188.9, filed on Nov. 27, 2014. These applications are hereby incorporated by reference herein.

FIELD OF THE INVENTION

The invention relates to a positions determination apparatus, method and computer program for determining positions, at which an interventional instrument is located, in a projection image. The invention relates further to an interventional system comprising the positions determination apparatus for determining positions, at which an interventional instrument is located, in a projection image.

BACKGROUND OF THE INVENTION

WO 2013/001388 A1 discloses a system for providing a live three-dimensional image of a body lumen. The system is adapted to determine the three-dimensional shape of a flexible surgical tool in the body lumen using optical shape sensing and to take an x-ray image of the body lumen, wherein at least one of the body lumen and the surgical tool is radiopaque. The system is further adapted to register the determined three-dimensional surgical tool shape to the x-ray image.

US 2008/0095421 A1 discloses a method for registering a fluoroscopy image with data representing a volume. The fluoroscopy image is registered with ultrasound data, the ultrasound data are registered with the data representing the volume, and the fluoroscopy image is registered with the data representing the volume as a function of the registrations of the fluoroscopy image with the ultrasound data and the ultrasound data with the data representing the volume.

The article "3-D Respiratory Motion Compensation during EP Procedures by Image-Based 3-D Lasso Catheter Model Generation and Tracking" by A. Brost et al., MICCAI 2009, Part I, pages 394 to 401, Springer Verlag, Berlin Heidelberg (2009) discloses a system for compensating three-dimensional respiratory motion during electrophysiological procedures. A biplane x-ray C-arm system generates two-dimensional projection images of a special circumferential catheter in two acquisition directions for different times. For each time a three-dimensional model of the catheter is reconstructed based on the two-dimensional projection images, in order to provide a time-dependent three-dimensional model of the catheter. This time-dependent three-dimensional model of the catheter is used for estimating the three-dimensional respiratory motion which is finally used for carrying out the motion compensation.

Interventional systems are known, which comprise an interventional instrument like a catheter for being introduced into a person, a tracking device for tracking the location of the interventional instrument within the person, a projection device for generating a projection image of the person, and a display for showing the tracked location of the interventional instrument within the person overlaid with the projection image. The projection device comprises a radiation source for emitting radiation for traversing the person and a detector with a detection surface for detecting the radiation after having traversed the person and for generating the projection image based on the detected radiation.

In order to allow the display to show the tracked location of the interventional instrument overlaid with the projection image, the tracking device and the projection device need to be registered to each other. The registration can be performed by, for instance, detecting the location of the interventional instrument in several projection images and by determining registration parameters defining a transformation between the location of the interventional instrument detected in the projection images and the location of the interventional instrument tracked by the tracking device. Registering the projection device with the tracking device based on a tracked location of the interventional instrument and based on locations of the interventional instrument detected in the projection images may not be very accurate.

SUMMARY OF THE INVENTION

It is an object of the present invention to provide a positions determination apparatus, method and computer program for determining positions, at which an interventional instrument is located, in a projection image very accurately, in order to improve a registration, which is based on the determined positions, between a projection device for generating the projection image and a tracking device for tracking the location of the interventional instrument. It is a further object of the present invention to provide an interventional system comprising the positions determination apparatus for determining positions, at which an interventional instrument is located, in a projection image.

In a first aspect of the present invention a positions determination apparatus is presented, wherein the positions determination apparatus is adapted to determine positions, at which an interventional instrument is located, in a projection image and wherein the positions determination apparatus comprises:

a projection image providing unit for providing a projection image, which shows the interventional instrument and which has been generated by a projection device, a representation providing unit for providing a three-dimensional representation of the interventional instrument, which is defined by a position and shape of the interventional instrument as determined by a tracking device for tracking the location of the interventional instrument, an input unit for allowing a user to indicate the position of a tip of the interventional instrument in the projection image, and a positions determination unit for determining positions, at which the interventional instrument is located, in the projection image based on the provided projection image, the provided representation and the indicated position of the tip of the interventional instrument in the projection image.

Since the positions determination unit does not simply use the projection image for determining positions in the projection image, at which the interventional instrument is located, but additionally also the provided three-dimensional representation of the interventional instrument, which is defined by the position and shape of the interventional instrument as determined by the tracking device, and the user-indicated position of the tip of the interventional instrument in the projection image, the positions, at which the interventional instrument is located, in the projection image can be determined very accurately. These determined positions can be used to accurately register the projection device with the tracking device.

The interventional instrument is preferably an interventional device to be used during an interventional procedure, especially an elongated interventional instrument, which may be located within or outside of a person or an animal while tracking the location of the interventional instrument. For example, the interventional instrument can be a catheter, a needle, a guidewire, an endoscope, et cetera. The provided representation of the interventional instrument defines the position and shape of the interventional instrument during the generation of the projection image. The representation providing unit can be a storing unit, in which the three-dimensional representation is stored already and from which the stored three-dimensional representation can be retrieved for providing the same, and/or the representation providing unit can be a receiving unit for receiving a three-dimensional representation from a tracking device for tracking the position and shape of the interventional instrument, wherein the receiving unit can then be adapted to provide the received three-dimensional representation. The representation providing unit can also directly be the tracking device for tracking the location, i.e. the position and shape, of the interventional instrument. The representation providing unit is preferably adapted to provide optical shape sensing (OSS) data, in order to provide the three-dimensional position and shape and hence the representation of the interventional instrument.

The projection image is a two-dimensional image. Preferentially, it has been generated by projecting the interventional instrument, i.e. the real three-dimensional interventional instrument, onto a two-dimensional area. The projection device preferentially comprises a radiation source for emitting radiation for traversing an imaging region of the projection device, in which the interventional instrument is located, and a detector with a detection surface for detecting the radiation after having traversed the imaging region and for generating the projection image based on the detected radiation. The projection image providing unit can be a storing unit, in which one or several projection images are stored and from which the one or several projection images can be retrieved for providing the same. However, the projection image providing unit can also be a receiving unit for receiving one or several projection images from the projection device and for providing the received one or several projection images. The projection image providing unit can also be the projection device itself.

The projection image providing unit is preferably adapted to provide several projection images, in which the interventional instrument is shown in different directions, wherein the input unit allows the user to indicate the location of the tip of the interventional instrument in each provided projection image and wherein the positions determination unit is adapted to determine the positions, at which the interventional instrument is located, in each projection image based on the respective provided projection image, the provided representation and the position of the tip of the interventional instrument indicated in the respective projection image. In particular, the positions determination unit can be adapted to determine the positions, at which the interventional instrument is located, for each projection image separately. The projection device is preferably adapted to rotate the radiation source and preferentially also the detector relative to the interventional instrument, in order to allow the projection device to generate different projection images in which the interventional instrument is shown in different directions, i.e. for different projection directions. The projection device is preferentially an x-ray projection device for generating x-ray projection images, especially a C-arm x-ray projection device.

The input unit preferentially includes a graphical user interface and a computer mouse, a keyboard, a touch pad, et cetera, in order to allow the user to indicate the position of the tip of the interventional instrument in the projection image. For instance, the projection image may be shown on a display and the input unit may allow the user to indicate the position of the tip of the interventional instrument on the display. If the input unit includes a touch pad, the display and the input unit may be an integrated device, wherein the display of the touch pad shows the projection image and the user can indicate the position of the tip of the interventional instrument in the projection image by using the touch pad.

In an embodiment the positions determination unit is adapted to i) spatially transform the representation such that a similarity measure, which depends on a deviation between a) a virtual projection of the spatially transformed representation on the detection surface of the detector and b) the interventional instrument in the projection image, is increased, wherein the spatial transformation includes a translation of the representation such that the tip of the virtual projection of the translated representation coincides with the indicated position of the tip of the interventional instrument in the projection image, and ii) determine the positions, at which the interventional instrument is located, in the projection image based on the spatially transformed representation. The virtual projection of the spatially transformed representation may include a projection of an entire portion of the representation, which is within the imaging region of the projection device, or a projection of only a part of this portion. It is performed in the projection geometry used for generating the projection image.

Moreover, the spatial transformation may include a rotation of the translated representation such that the similarity measure is increased. The rotation is preferably defined by a rotation angle around the tip of the translated representation. By using the indicated position of the tip of the interventional instrument in the projection image for translating the representation and as a position around which the representation is rotated, the accuracy of determining the positions, at which the interventional instrument is located, in the projection image, which is based on the spatially transformed representation, can be further increased. This can lead to a further improved registration of the projection device with the tracking device.

The positions determination unit can be adapted to determine curvature values along the virtually projected spatially transformed representation and to determine the positions, at which the interventional instrument is located, in the projection image based on the curvature values. In particular, the positions determination unit can be adapted to divide the virtually projected spatially transformed representation into several segments, determine for each segment the largest curvature value, and determine the positions, at which the interventional instrument is located, in the projection image based on the positions of the respective largest curvature value determined for the respective segment. By determining the positions, at which the interventional instrument is located, in the projection image based on the curvature values, the accuracy of determining these positions can be further increased, which in turn can lead to a further improved registration between the projection device and the tracking device.

The input unit may be adapted to allow the user to indicate further positions of the interventional instrument in the projection image, wherein the positions determination unit is adapted to determine positions, at which the interventional instrument is located, in the projection image based on the provided projection image, the provided representation, the indicated position of the tip of the interventional instrument in the projection image and the further positions indicated by the user. In particular, the positions determination unit may be adapted to weight the contribution of the further positions indicated by the user to the determination of the positions, at which the interventional instrument is located, in the projection image, wherein the weighting depends on the number of the further positions indicated by the user. For instance, if the determination of the positions includes a spatially transformation of the representation such that a similarity measure, which depends on a first deviation between a) a virtual projection of the spatially transformed representation on the detection surface of the detector and b) the interventional instrument in the projection image, is increased, the similarity measure may further depend on a second deviation between a) a virtual projection of the spatially transformed representation on the detection surface of the detector and b) the further positions indicated by the user. In particular, the similarity measure can be a weighted combination of a first similarity depending on the first deviation and a second similarity depending on the second deviation, wherein a weight used for the second similarity can depend on the number of the further positions indicated by the user. Preferentially, the weight for the second similarity measure increases with an increasing number of further positions indicated by the user. By considering the further positions indicated by the user together with the provided projection image, the provided representation and the indicated position of the tip of the interventional instrument in the projection image the accuracy of determining the positions, at which the interventional instrument is located, in the projection image can be further increased, which in turn can lead to a further improved registration between the projection device and the tracking device.

The registration can be performed by a registration unit for determining registration parameters defining a registration of the projection device with the tracking device based on the determined positions, at which the interventional instrument is located, in the projection image and the provided representation defined by the position and shape of the interventional instrument. Moreover, the registration unit may be adapted to apply the registration parameters to a projection image provided by the projection image providing unit, which might be the same projection image which had been used for determining the registration parameters or which might be another projection image generated by the projection device, and/or to a representation, which might be the same representation which had been used for determining the registration parameters or which might be another representation defined by a position and shape determined by the tracking device, in order to register the projection image and the representation to each other, wherein the positions determination apparatus further comprises a display for showing the projection image together with the registered representation. Thus, the display can accurately show the location of the interventional instrument in the projection image. For instance, the location of an interventional instrument can be shown within a person or an animal shown in the projection image.

The display may show the projection image and markers representing the determined positions, at which the interventional instrument is located, in the projection image, wherein the input unit may be adapted to allow the user to correct the determined positions, wherein the registration unit may be adapted to determine the registration parameters based on the corrected positions. Thus, before registering the projection device with the tracking device, the user may have the possibility to correct the determined positions, at which the interventional instrument is located, in the projection image. This can lead to a further improved registration between the projection device and the tracking device.

Moreover, the display may show the projection image together with the representation and markers representing the determined positions, at which the interventional instrument is located, in the projection image after registration, wherein the input unit may be adapted to allow the user to modify the determined positions, wherein the registration unit may be adapted to update the registration parameters and the registration between the projection image and the representation based on the corrected positions, wherein the display may show the projection image together with the representation of the interventional instrument in accordance with the updated registration and markers representing the modified positions. Thus, the user may modify the determined positions until the user is satisfied with the registration result. Also this can lead to a further improved registration between the projection device and the tracking device.

In a further aspect of the present invention an interventional system is presented, wherein the interventional system comprises:

an interventional instrument for carrying out an interventional procedure within a subject, and a positions determination apparatus as defined in claim 11 for showing a projection image, which shows the subject, together with a registered representation of the interventional instrument.

In a further aspect of the present invention a positions determination method for determining positions, at which an interventional instrument is located, in a projection image is presented, wherein the positions determination method comprises:

providing a projection image, which shows the interventional instrument and which has been generated by a projection device, by a projection image providing unit, providing a three-dimensional representation of the interventional instrument, which is defined by a position and shape of the interventional instrument as determined by a tracking device for tracking the location of the interventional instrument, by a representation providing unit, allowing a user to indicate the position of a tip of the interventional instrument in the projection image by an input unit, and determining positions, at which the interventional instrument is located, in the projection image based on the provided projection image, the provided representation and the indicated position of the tip of the interventional instrument in the projection image by a positions determination unit.

In another aspect a computer program for determining positions, at which an interventional instrument is located, in a projection image is presented, wherein the computer program comprises program code means for causing a positions determination apparatus, to carry out the steps of a positions determination method when the computer program is run on a computer controlling the positions determination apparatus.

It shall be understood that the positions determination apparatus, the interventional system, the positions determination method, and the computer program have similar and/or identical preferred embodiments, in particular, as described herein.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
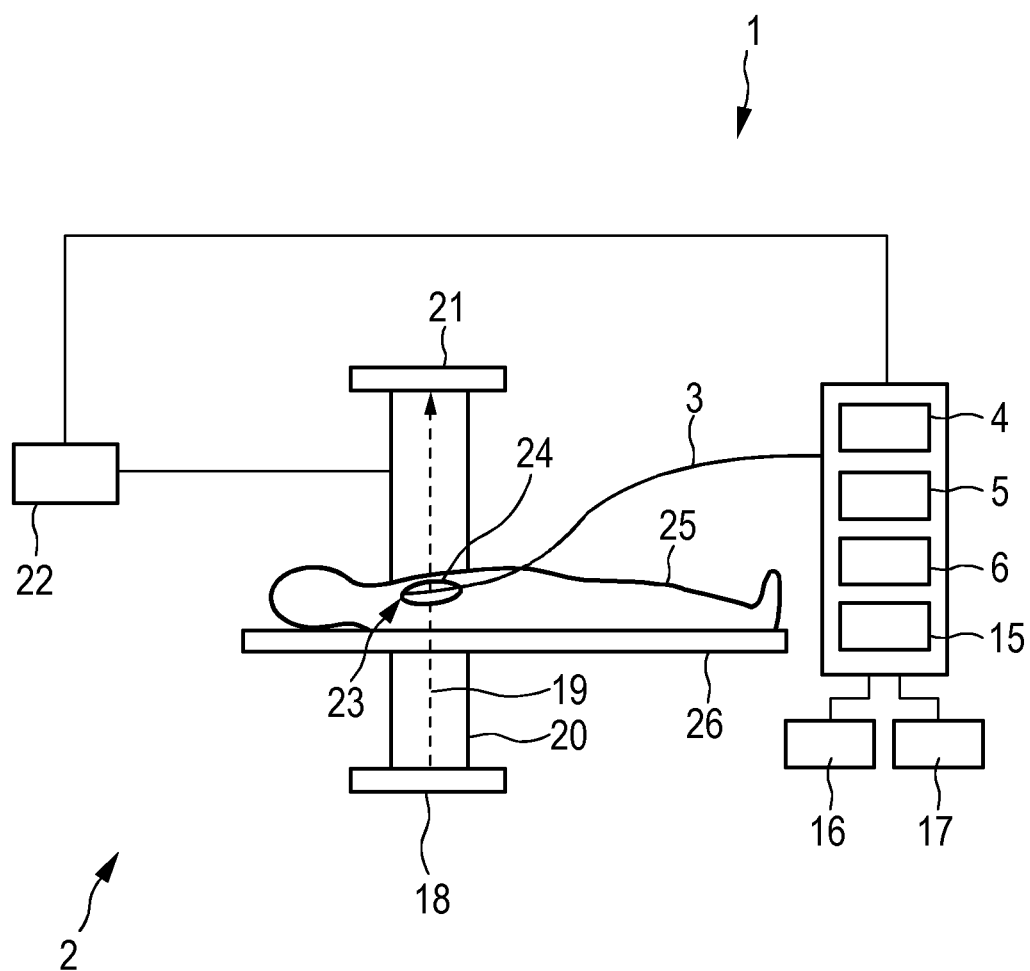
FIG. 1 shows schematically and exemplarily an embodiment of an interventional system.

FIG. 1 shows schematically and exemplarily an embodiment of an interventional system. The interventional system 1 comprises an interventional instrument 3 for carrying out an interventional procedure. In this embodiment the interventional instrument 3 is a catheter which is controlled by a catheter control unit 15. The catheter control unit 15 and the catheter 3 may be adapted to perform, for instance, an ablation procedure within a heart 24 of a person 25 lying on a support means like a patient table 26. However, the catheter 3 and the catheter control unit 15 can also be adapted to perform another interventional procedure. Moreover, the interventional system can also comprise another interventional instrument like a needle. In this embodiment the catheter 3 is adapted to apply a radio frequency (RF) ablation procedure, wherein the catheter control unit 15 is adapted to provide RF energy to ablation electrodes arranged at the tip 23 of the catheter 3.

The catheter 3 is equipped with OSS fibers connected to a tracking control unit 4 for determining the location of the catheter 3 within the person 25, i.e. for determining the three-dimensional position and shape of the catheter 3 within the person 25, by OSS. For determining the location of the catheter 3 within the person 25 known OSS techniques can be used like the technique disclosed in U.S. Pat. No. 7,772,541 B2 which is herewith incorporated by reference. The OSS fibers of the catheter 3 and the tracking control unit 4 can be regarded as being a tracking device for tracking the location of the catheter 3 within the person 25. Moreover, since the OSS fibers of the catheter 3 and the tracking control unit 4 provide the position and shape and thereby a representation of the catheter 3, the OSS fibers of the catheter 3 and the tracking control unit 4 can also be regarded as being a representation providing unit for providing a three-dimensional representation of the catheter 3 defined by the three-dimensional position and shape of the catheter 3.

The interventional system 1 further comprises a projection device 2 being, in this embodiment, an x-ray C-arm device. The projection device 2 comprises an x-ray source 18 for generating x-rays 19 traversing the person 25 and an x-ray detector 21 with a detection surface for detecting the x-rays after having traversed the person 25 and for generating a projection image based on the detected radiation 19. The x-ray source 18 and the x-ray detector 21 are attached to a C-arm 20, which is rotatable around the person 25 for acquiring projection images in different projection directions. The projection device 2 is controlled by a projection device control unit 22 which receives the projection images and provides the projection images to, for instance, a positions determination unit 5 and a display 17.

The interventional system 1 further comprises an input unit 16 for allowing a user to indicate the position of the tip 23 of the catheter 3 in the projection images. In particular, the input unit 16 provides a graphical user interface allowing the user via, for instance, a computer mouse, a keyboard, a touch pad, et cetera, to indicate the location of the tip 23 of the catheter 3 on the display 17 which may show the projection image. If the input unit 16 includes a touch pad, the projection images may be shown on the touch pad and the touch pad may be used to indicate the position of the tip 23 of the catheter 3 in the projection images, i.e. in this case the input unit 16 and the display 17 may be integrated in a single device.

The positions determination unit 5 is adapted to determine positions, at which the catheter 3 is located, in the projection images based on the provided projection images, the provided three-dimensional representation and the indicated positions of the tip 23 of the catheter 3 in the projection images. In particular, the positions determination unit 5 is adapted to spatially transform the representation such that a similarity measure, which depends on a deviation between a) a virtual projection of the spatially transformed representation on the detection surface of the detector 21 and b) the catheter 3 in the projection image, is increased, wherein the spatial transformation includes a translation of the representation such that the tip of the virtual projection of the translated representation coincides with the indicated position of the tip 23 of the catheter 3 in the projection image. The positions determination unit 5 is preferentially further adapted to determine the positions, at which the catheter 3 is located, in the projection image based on the spatially transformed representation.

The spatial transformation performed by the positions determination unit 5 preferentially further includes a rotation of the translated representation such that the similarity measure is increased, wherein the rotation is defined by a rotation angle around the tip of the translated representation. The positions, at which the catheter 3 is located, in the projection image are preferentially determined based on curvature values along the virtually projected spatially transformed representation. In particular, the positions determination unit 5 is preferentially adapted to divide the virtually projected spatially transformed representation into several segments, to determine for each segment the largest curvature value, and to determine the positions, at which the catheter 3 is located, in the projection image based on the positions of the respective largest curvature value determined for the respective segment. In an embodiment the positions determination unit 5 may be adapted to provide for each segment the position of the respective largest curvature value as a position at which the catheter 3 is located in the projection image.

The input unit 16 can be adapted to allow the user to indicate not only the position of the tip 23 of the catheter 3 in the projection image, but to also indicate further positions of the catheter 3 in the projection image, wherein the positions determination unit 5 can be adapted to determine positions, at which the catheter 3 is located, in the projection image based on the provided projection image, the provided representation, the indicated position of the tip 23 of the catheter 3 in the projection image and the further positions indicated by the user. In particular, the positions determination unit 5 can be adapted to weight the contribution of the further positions indicated by the user to the determination of the positions, at which the catheter 3 is located, in the projection image, wherein the weighting may depend on the number of the further positions indicated by the user. For instance, the similarity measure may not only depend on a deviation between a) a virtual projection of the spatially transformed representation on the detection surface of the detector 21 and b) the catheter 3 in the projection image, which may be regarded as being a first deviation, but the similarity measure may further depend on a second deviation between a) a virtual projection of the spatially transformed representation on the detection surface of the detector 21 and b) the further positions indicated by the user. Thus, the similarity measure can be a weighted combination of a first similarity, which depends on the first deviation, and a second similarity, which depends on the second deviation, wherein a weight used for the second similarity can depend on the number of the further positions indicated by the user. For example, the weight for the second similarity measure can increase with an increasing number of further positions indicated by the user.

The interventional system 1 further comprises a registration unit 6 for determining registration parameters defining a registration of the projection device 2 with the tracking device based on the positions, at which the catheter 3 is located and which have been determined by the positions determination unit 5, in the projection image, the one or several positions indicated by the user and the provided representation defined by the position and shape of the catheter 3 as determined by the tracking device. The projection image and markers representing the positions, which have been determined by the positions determination unit 5, and representing the one or several positions indicated by the user may be shown on the display 17, wherein the user may correct the positions via the input unit 16 and wherein the registration unit 6 may then determine the registration parameters based on the corrected positions. Thus, before registering the projection device 2 with the tracking device, the user may have the possibility to correct especially the positions which have been determined by the positions determination unit 5.

The registration unit 6 is further adapted to apply the registration parameters to the projection image and/or the representation, in order to register the projection image and the representation to each other. The registered projection image and representation may be shown on the display 17 together with markers representing the determined positions, at which the catheter 3 should be located, and optionally representing one or several further positions indicated by the user. The user may then modify the determined positions via the input unit 16 and the registration unit 6 may update the registration parameters and the registration between the projection device and the tracking device based on the modified positions, wherein the display 17 may show the projection image and the representation in accordance with the updated registration and the markers representing the modified positions. Thus, the user may modify the determined positions, until the user is satisfied with the registration result.

The projection device 2, the tracking device 3, 4, the input unit 16, the display 17, the positions determination unit 5 and the registration unit 6 may be regarded as being components of a positions determination apparatus for determining positions, at which the catheter 3 is located, in the projection image.

Figure 2:
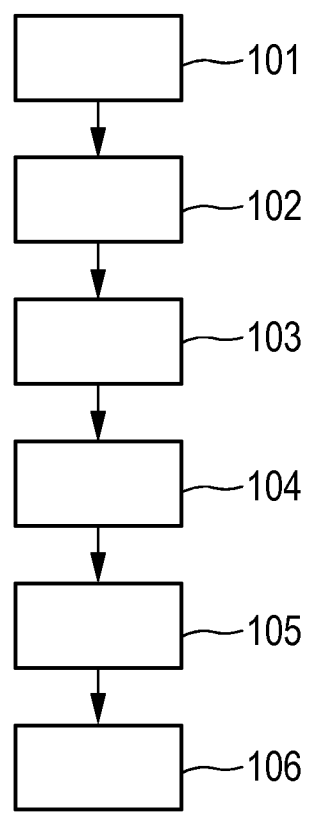
FIG. 2 shows a flowchart exemplarily illustrating an embodiment of a positions determination method for determining positions, at which a catheter is located, in a projection image.

In the following an embodiment of a positions determination method for determining positions, at which the catheter 3 is located, in a projection image will exemplarily be described with reference to a flowchart shown in FIG. 2.

In step 101 a projection image, which shows the catheter 3, is generated by the projection device 2. Moreover, in step 101 the three-dimensional position and shape of the catheter 3 is determined by the tracking device, thereby defining a three-dimensional representation of the catheter 3. At this stage the tracking device and the projection device 2 are not registered to each other.

In step 102 a user is allowed to indicate the position of the tip 23 of the catheter 3 in the projection image via the input unit 16, and in step 103 positions, at which the catheter 3 is located, in the projection image are determined based on the provided projection image, the provided representation and the indicated position of the tip 23 of the catheter 3 in the projection image by the positions determination unit 5. In step 104 the registration unit 6 determines registration parameters defining a registration of the projection device 2 with the tracking device based on the determined positions, at which the catheter 3 is located, in the projection image and the provided representation which is defined by the position and shape of the catheter 3. In step 105 the registration parameters are applied to the projection image and/or the representation of the catheter 3, in order to register the projection image and the representation to each other, and in step 106 the projection image is shown together with the registered representation on the display 17.

The projection device 2 may be adapted to provide several projection images for different projection directions, wherein in each projection image the catheter 3 is shown. The input unit 16 may then allow the user to indicate the position of the tip 23 of the catheter 3 in each projection image and the positions determination unit 5 may be adapted to determine for each projection image positions, at which the catheter 3 is located in the respective projection image, based on the respective projection image, the provided representation of the catheter 3 and the position of the tip 23 of the catheter 3 indicated in the respective projection image. In particular, the positions determination unit 5 may be adapted to spatially transform the representation such that a similarity measure, which depends on deviations between a) a virtual projection of the spatially transformed representation on the detection surface of the detector 21 in the respective projection direction and b) the catheter 3 in the respective projection image, is increased, especially maximized. Thus, for each projection image a deviation may be determined and these deviations may be combined, for instance, linearly combined, in order to provide a similarity measure, wherein the representation is spatially transformed such that the similarity measure is optimized. For each projection image, positions, at which the catheter 3 is located in the respective projection image, may then be determined based on the respective virtually projected spatially transformed representation. In particular, the respective virtually projected spatially transformed representation may be divided into several segments, wherein for each segment a largest curvature value may be determined and wherein the positions, at which the catheter 3 is located, in the projection image may be determined based on the positions of the respective largest curvature value determined for the respective segment.

The interventional system, especially the positions determination apparatus, is preferably adapted to locate the catheter in a projection image, which is preferably an x-ray image, by using the catheter tip position provided by the user and the OSS data generated by the OSS system, i.e. by the tracking device. Thus, the user indicates the tip position of the OSS-enabled catheter 3 in the projection image, while the OSS interrogator, i.e. the tracking device, keeps producing OSS data being indicative of the three-dimensional position and shape of the catheter 3 relative to a coordinate system of the tracking device. At this stage the coordinate system of the tracking device and a coordinate system of the projection device are not registered to each other such that OSS-determined coordinates cannot be exactly overlaid with coordinates which are known relative to the coordinate system of the projection device. A set of points is selected from high curvature regions of the spatially transformed and virtually projected catheter 3 in the projection image, in order to determine positions, at which the catheter 3 is present, in the projection image. In an embodiment, immediately after the user has indicated the position of the tip of the catheter in a projection image, new points, i.e. further positions, are determined and are presented to the user overlaid on the projection image via the display, wherein at this stage the registration procedure has not been performed and the user can check the generated new points and correct them if necessary. If several projection images are present, the user can check and correct the new points also in the other projection images if necessary. The registration then starts after the user's verification and possible correction of the positions of the generated new points. In a further embodiment the registration may immediately start after the additional new points, i.e. the positions, at which the catheter 3 is located within the projection image, have been determined. The registered representation of the catheter 3 defined by the position and shape of the catheter 3 determined by the tracking device, the registered projection image and markers representing the generated new points can then be shown to the user on the display and the user can accept the registration. Alternatively, the user can correct one or more of the generated new points and/or the user can add additional points to the projection image, wherein then only the registration procedure or the determination of the new points together with the registration procedure can be repeated based on the present points which may have been corrected or newly added by the user. If several projection images are used, each projection image may be handled separately such that the proposed algorithm may be used for single view registration update.

The positions determination unit 5 is preferentially adapted to process the provided projection image, in order to identify the catheter 3 in the projection image, wherein the processed provided projection image is used together with the provided representation and the indicated position of the tip 23 of the catheter 3 in the projection image for determining the positions at which the catheter 3 is located in the projection image. In particular, the positions determination unit 5 is adapted to generate a vesselness image based on the projection image and to normalize the vesselness image, i.e. the vesselness image, which emphasizes the catheter pixels in the image, may be mapped to a predefined fixed image value range which may be, for instance, [1,10]. For generating the vesselness image well know methods can be used like the method disclosed in the article "Multiscale vessel enhancement filtering" by A. F. Frangi, W. J. Niessen, K. L. Vincken, and M. A. Viergever in Medical Image Computing and Computer-Assisted Intervention (MICCAI), Lecture Notes in Computer Science, volume 1496, pages 130 to 137 (1998), which is herewith incorporated by reference.

Figure 3:
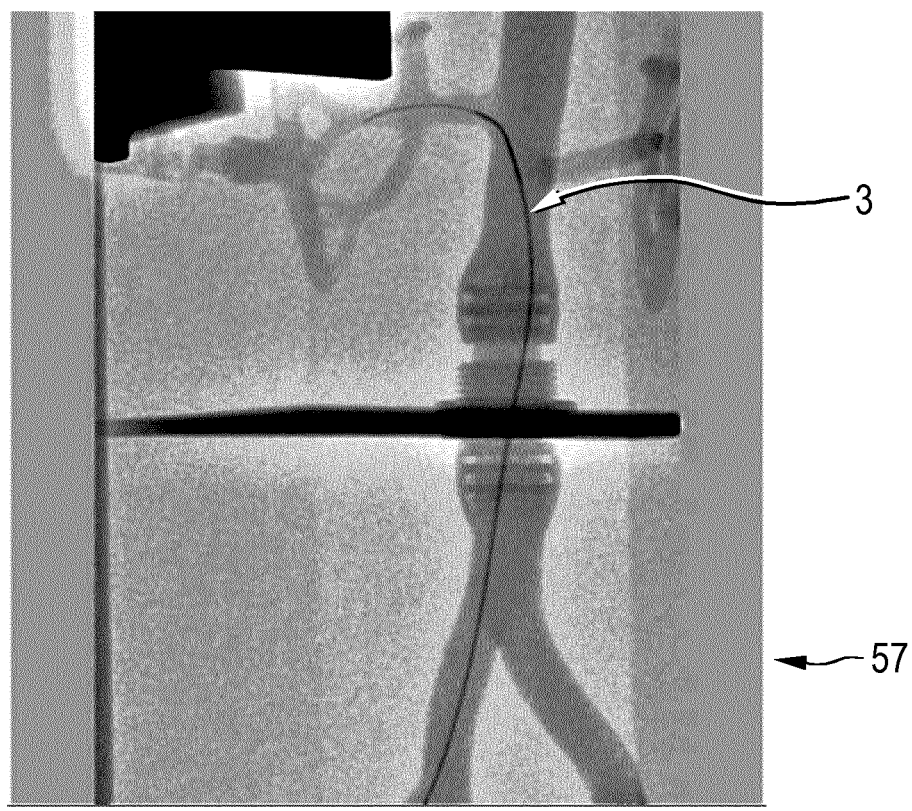
FIG. 3 shows schematically and exemplarily a projection image.
Figure 4:
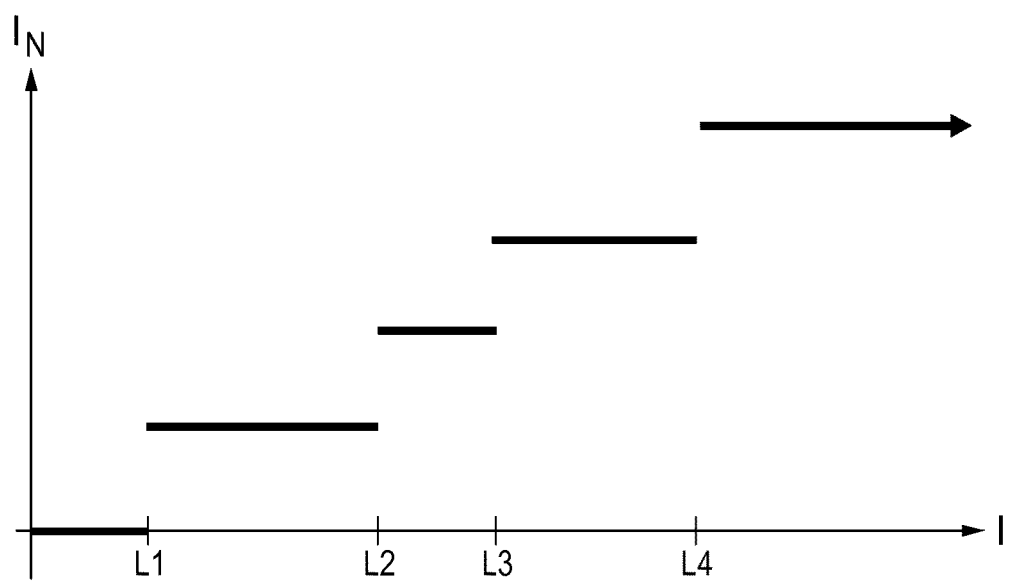
FIG. 4 illustrates schematically and exemplarily quantization levels for normalizing a vesselness image.
Figure 5:
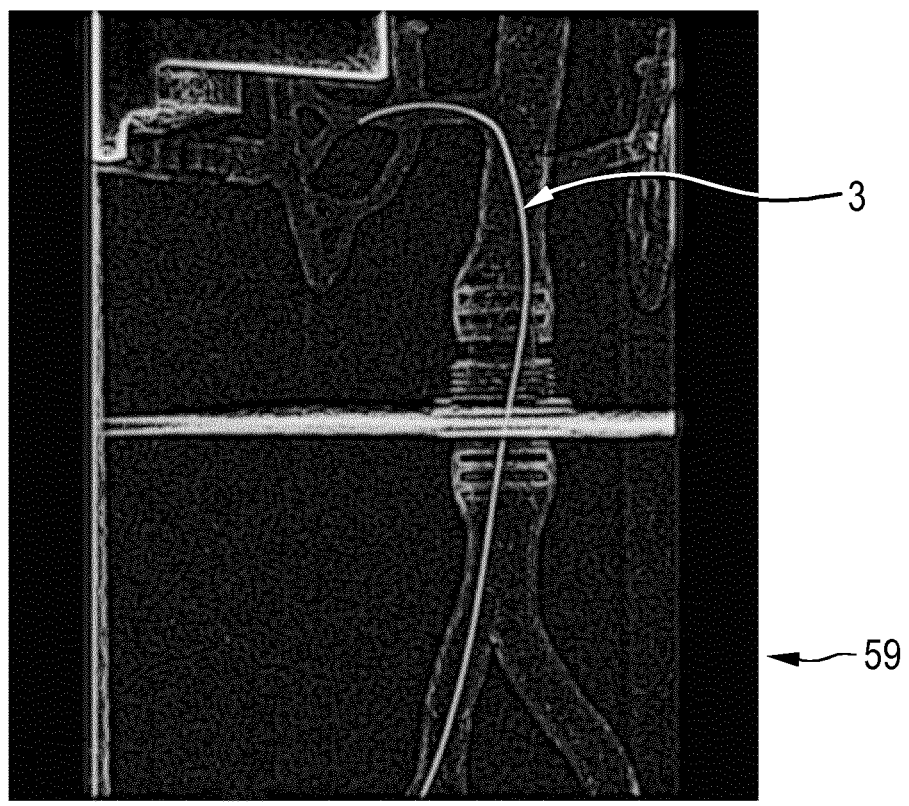
FIG. 5 shows schematically and exemplarily a normalized vesselness image.

FIG. 3 shows schematically and exemplarily a projection image 57 showing the catheter 3. This projection image 57 may be processed, in order to generate a vesselness image. In order to normalize the vesselness image the vesselness image is preferentially divided into M×N blocks, wherein within each block an image element, i.e. a pixel, with a maximal image value is detected as seed and the seeds are ranked in accordance with their respective image value, i.e. their respective vesselness value. Based on this ranking of the seeds quantization levels are determined, which define which vesselness values should be mapped to which normalized values. In particular, quantization levels are determined by determining border seeds which subdivide ranked seeds into a number of groups which corresponds to the number of desired quantization levels. The border seeds are preferentially equally distributed along the ranked seeds and define groups having the same size. The quantization levels are then defined by the intensities of the border seeds. For instance, if there are 100 seeds and 9 quantization levels are desired, a first border seed can be the 10-th seed in the ranked list, a second border seed can be the 20-th seed in the ranked list, and so on. The intensity of the 10-th seed then defines a first quantization level, the intensity of the 20-th seed defines a second quantization level, et cetera. The number of quantization levels can of course be larger or smaller than 9. For instance, in an embodiment quantization levels $L_1 \ldots L_4$ divide image values I into five ranges as schematically and exemplarily illustrated in FIG. 4, wherein each range is mapped to a corresponding normalized image value $I_N$. A normalized vesselness image 59 is schematically and exemplarily shown in FIG. 5.

The positions determination unit 5 is preferentially further adapted to determine a distance map based on the normalized vesselness image, wherein the image values of the distance map indicate the distance of the respective pixel of the distance map to the closest pixel of the catheter 3. For estimating the pixels of the catheters 3 the normalized vesselness image may be thresholded. For instance, if the normalized vesselness image has been generated by mapping the original vesselness image to a range of [1,10], the normalized vesselness image may be thresholded by only showing image values being equal to or larger than 6. The distance map may then be calculated based on the thresholded image.

The positions determination unit 5 knows the position of the tip 23 of the catheter 3 in the projection image and also knows the unregistered three-dimensional position and shape of the catheter 3 as determined by the tracking device. The projection determination unit 5 is adapted to use this information to localize the catheter 3 in the projection image. The localization may be approximate and may not need to be pixel accurate, i.e. shortcuts and approximations may be used for localizing the catheter 3 in the respective projection image. Generally, determining rigid transformation parameters for spatially transforming the representation of the catheter 3 defined by the determined three-dimensional position and shape of the catheter 3 such that its projection onto the detection surface of the detector corresponds to the catheter 3 shown in the projection image requires a search in a six-dimensional space. However, given the tip position indicated by the user, the search can be reduced to finding rotational parameters in a three-dimensional space only. Therefore, the positions determination unit 5 is preferentially adapted to translate the three-dimensional representation of the catheter 3 such that the projection of the tip of the representation onto the projection image is aligned with the position of the tip of the catheter 3 in the projection image as indicated by the user. In particular, the positions determination unit 5 is preferentially adapted to translate the three-dimensional representation of the catheter 3 such that the projection of its tip corresponds to the tip of the catheter in the distance map. However, in an embodiment the translation can also be performed based on the original projection image or based on a projection image which has been processed in another way for estimating the position of the catheter in the projection image.

If the projection device has provided several projection images showing the catheter 3 in different projection directions, the positions determination unit 5 can be adapted to translate the three-dimensional representation of the catheter 3, which is defined by the three-dimensional position and shape determined by using the tracking device, such that the tip of the virtual projection of the translated representation coincides with the positions of the tip 23 of the catheter 3, which has been indicated by the user, in the different projection images.

Figure 6:
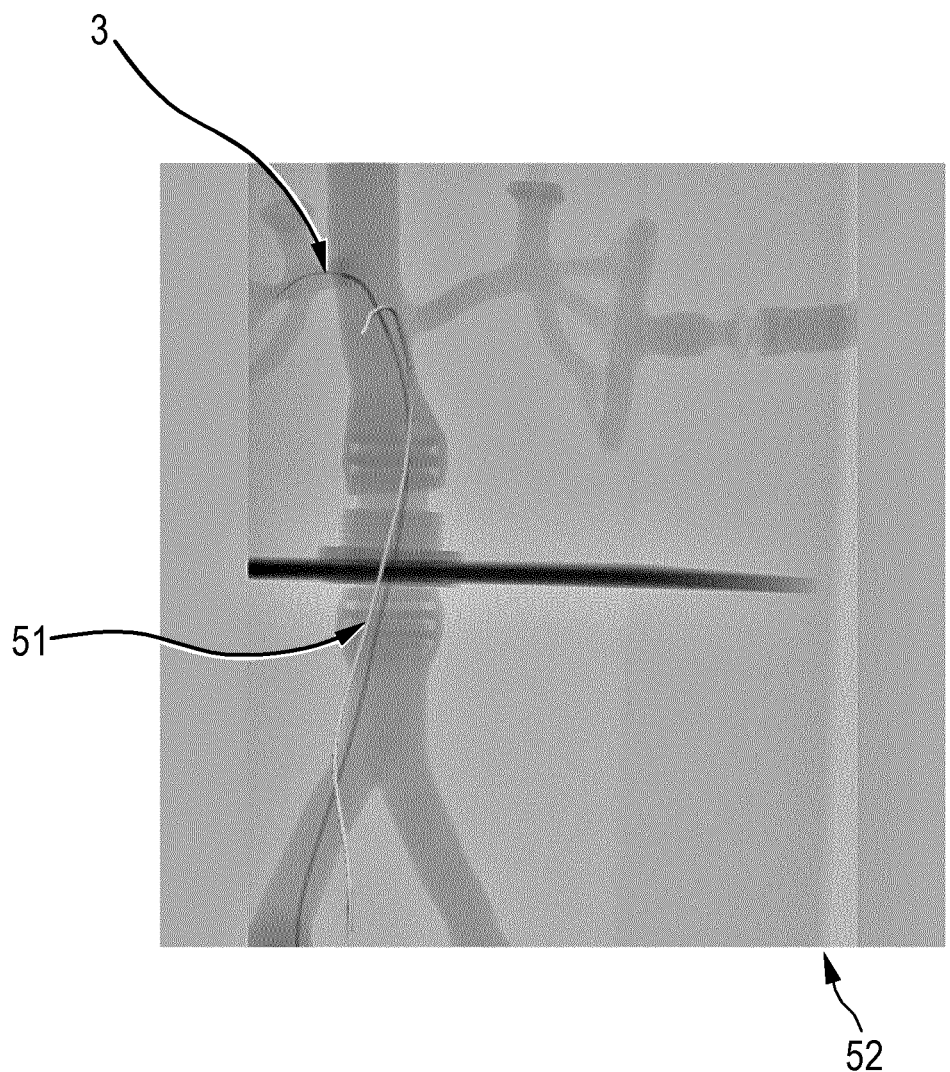
FIG. 6 shows schematically and exemplarily a projection image with a virtual projection of a representation of a catheter, before the representation has been translated.
Figure 7:
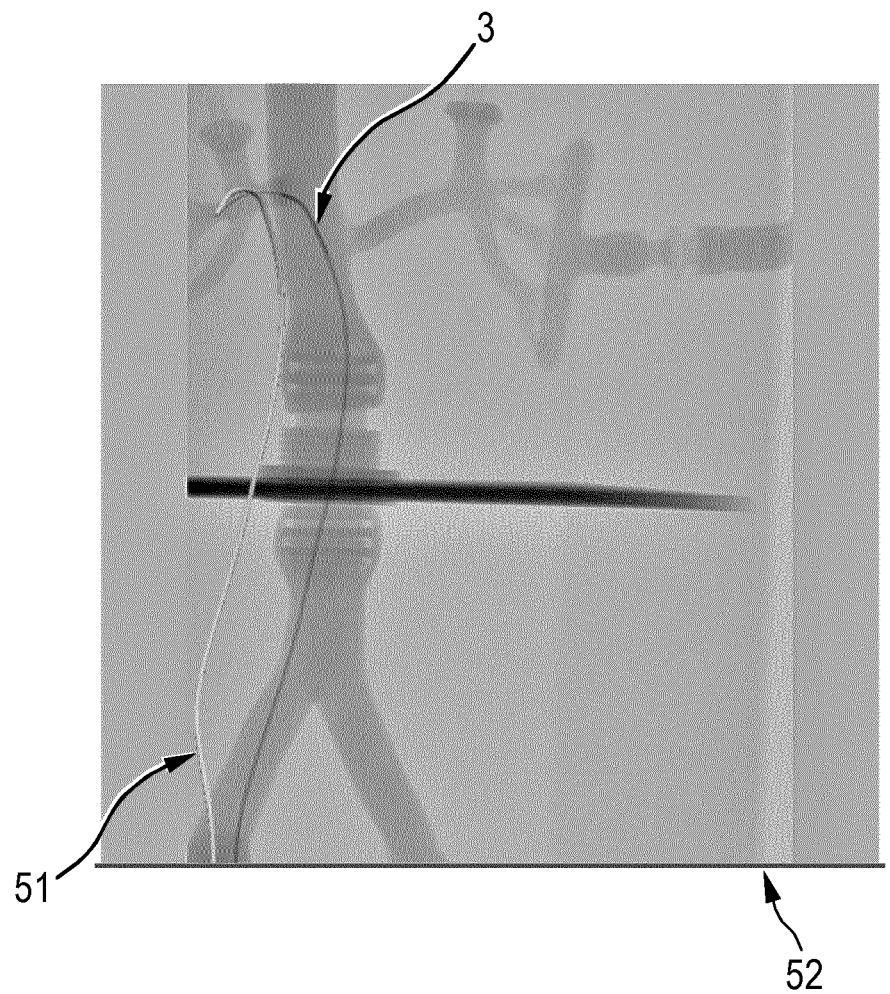
FIG. 7 shows schematically and exemplarily the projection image shown in FIG. 6, after the representation has been translated.

FIG. 6 schematically and exemplarily illustrates a projection image 52 showing the catheter 3 and a virtual projection 51 of the three-dimensional representation of the catheter 3 before translating the representation. FIG. 7 schematically and exemplarily illustrates the virtual projection 51 of the representation of the catheter 3 after the representation has been translated such that the tip of the virtual projection 51 coincides with the tip of the catheter 3 in the projection image 52.

Figure 8:
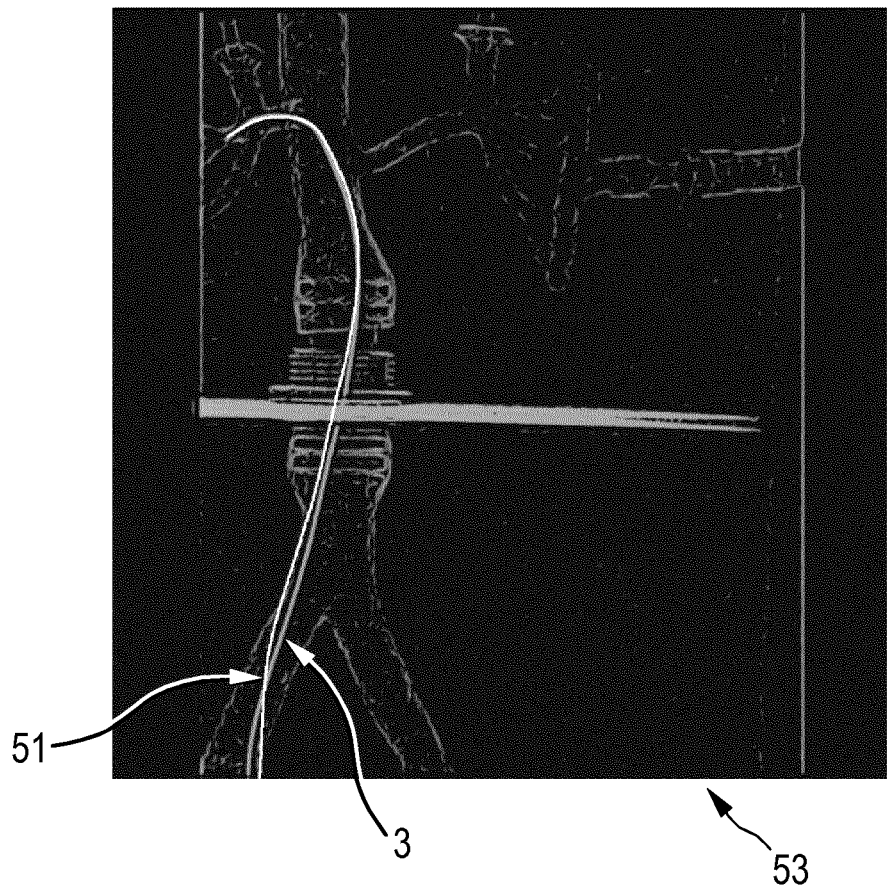
FIG. 8 shows schematically and exemplarily a virtual projection of a representation of the catheter, after the representation has been translated and rotated, on a normalized vesselness image.

The positions determination unit 5 is preferentially adapted to rotate the representation around its translated tip such that a similarity measure, which depends on a deviation between a) the virtual projection of the translated and rotated representation on the detection surface of the detector 21 in the respective projection geometry and b) the catheter 3 in the projection image, is increased. The deviation can be determined, for instance, by calculating the sum of squared distances between nearest points on the catheter 3 shown in the respective projection image and on the virtual projection of the translated and rotated representation. Also other distance measures may be used for indicating the degree of similarity between the virtual projection of the translated and rotated representation on the detection surface of the detector and the catheter 3 in the projection image. For determining the deviation the original projection image or a processed projection image, in particular, the distance map may be used, wherein positions of the catheter 3 within the projection image may be determined by segmentation which might be threshold based as described above. The determination of the rotation of the representation of the catheter 3 can be further based on positions in the projection image, which have been input by the user and which indicate positions other than the position of the tip of the catheter in the projection image. In particular, for determining the rotation of the representation a first image-based similarity measure and a second user-points-based similarity measure can be used, wherein these two measures can be linearly combined for providing a total similarity measure, wherein the representation is rotated around the translated tip such that the total similarity measure is increased, in particular, maximized. The total similarity measure $S_t$ may be defined by following equation:

$$S_t = w_i S_i + w_u S_u \text{ with} \quad (1)$$

$$w_i = 1 - w_u, \quad (2)$$

wherein $w_i$ denotes a first weight for weighting the first image-based similarity measure $S_i$ and $w_u$ denotes a second weight for weighting the second user-input-based similarity measure $S_u$. The weight may increase with the number of user-input positions indicating positions of the catheter other than the tip position in the projection image. For instance, each additional user-input position may increase the weight $w_u$ by 0.2 with a maximum value of 0.7. FIG. 8 schematically and exemplarily illustrates a virtual projection 51 of the representation on a processed projection image 53, after the representation has been translated and rotated.

Figure 9:
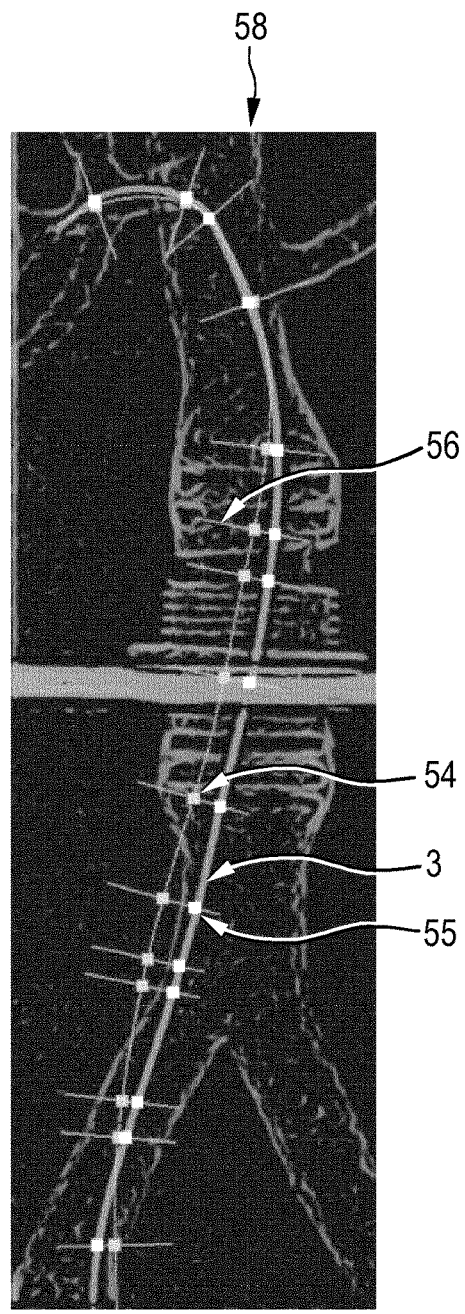
FIG. 9 illustrates schematically and exemplarily a refinement of positions at which the catheter is located on a normalized vesselness image.

The positions determination unit 5 is preferentially adapted to define non-overlapping segments along the virtually projected and translated and rotated representation and to determine for each segment the largest curvature value, wherein for each segment the position of the respective largest curvature value is provided as a respective candidate position at which the catheter 3 is located in the projection image. These determined positions may be refined by using the catheter 3 shown in the projection image. For instance, for each determined position a closest catheter pixel in the projection image may be determined, wherein the position of this closest catheter pixel may be the refined position. In particular, for each candidate position, i.e. for each position determined based on the curvature values, a local curve can be determined by using parts of the virtually projected representation preceding and following the candidate position. A search path can then be defined, which is perpendicular to the local curve and which intersects the candidate position, wherein for each position on the search path the distance to the catheter shown in the projection image may be determined. The position that has the lowest distance preferentially defines the refined position at which the catheter is present in the projection image. If the lowest distance is larger than a predefined value or if a salient minimum distance does not exist, a refined position may not be determinable and the corresponding candidate position may be rejected. FIG. 9 shows schematically and exemplarily a processed projection image 58 with candidate positions 54 and refined positions 55 on a catheter 3. FIG. 9 further shows search paths 56 used for determining the refined positions 55.

The refined positions may be further processed by selecting the refined position being farthest to the position of the tip of the catheter in the projection image. The remaining refined positions are ranked in accordance with the curvature values determined for the corresponding candidate positions. Then, starting from the highest ranked refined position, it is decided which further refined positions should be selected. When a refined position is considered for selection, its distances to all earlier selected refined positions are calculated. If the closest distance is smaller than a predefined minimum distance, the refined position is not selected. The selection process then proceeds with the next refined position in the list of ranked high-curvature refined positions, for instance, until all refined positions have been processed or until a desired number of refined positions has been selected. In another embodiment this kind of selection may not be performed, i.e. the refined positions may directly be the positions determined by the positions determination unit 5 as the positions at which the catheter is located in the projection image. Moreover, in an embodiment this kind of selection may be performed, but not the refinement, wherein in this case the selection may be applied to the positions of the respective largest curvature value of the respective segment of the virtual projection of the translated and rotated representation.

The positions determination unit 5 may be adapted to define the non-overlapping segments along the virtually projection of the translated and rotated representation by dividing the virtual projection into a predefined number of parts having a same length. However, the positions determination unit may also be adapted to divide the virtual projection in another way.

The registration unit may be adapted to generate a two-dimensional representation, which may be regarded as being a registration representation, based on the determined positions at which the catheter is located in the projection image. For instance, the two-dimensional registration representation may be generated by just connecting the determined positions by multiple line segments, by fitting a curve to the positions, et cetera. This two-dimensional registration representation may be determined in different projection images which have been generated in different projection directions, wherein the registration unit may be adapted to determine the registration parameters based on the tracked location of the catheter and on the locations of the two-dimensional registration representations in the different projection images. In particular, the registration unit may be adapted to determine the registration parameters by calculating two-dimensional virtual projections of the three-dimensional catheter representation as defined by the tracked position and shape of the catheter under consideration of the projection geometries used by the projection device for generating the different projection images and by calculating a spatial transformation between a coordinate system defined by the tracking device and a coordinate system defined by the projection device, which minimizes a deviation between a) the calculated two-dimensional virtual projections of the three-dimensional catheter representation defined by the tracked position and shape and b) the locations of the two-dimensional registration representations in the two-dimensional projection images.

Although in above described embodiments the projection image shows a catheter and the tracking device is adapted to determine the position and shape of the catheter, in other embodiments the projection image can show another interventional instrument and the tracking device can be adapted to determine the position and shape of the other interventional instrument. The interventional instrument can be any interventional instrument, which can be shown by the projection image and for which a three-dimensional representation can be provided. In particular, the interventional instrument can be any interventional instrument comprising optical shape sensing fibers for determining the position and shape, which define the three-dimensional representation, based on OSS.

After the tracking device has been registered with the imaging device, the tracked location of the interventional instrument can also be shown in further images, which have been acquired by the projection device or which have been acquired by another, further imaging device, if the projection device and the further imaging device are registered to each other. These further images can be, for instance, projection images, computed tomography images, magnetic resonance images, et cetera, which may have been acquired before an interventional procedure or during an interventional procedure. Moreover, although the interventional system described above with reference to FIG. 1 is adapted to perform an ablation procedure, in other embodiments the interventional system can be adapted to perform another interventional procedure.

Although in above described embodiments the projection image providing unit is adapted to provide an x-ray projection image, in other embodiments the projection image providing unit can also be adapted to provide a light projection image, i.e. a projection image which is not generated by x-rays, but by light, especially visual light. For instance, the projection image providing unit can provide a projection image, which has been generated by projecting an interventional instrument onto a two-dimensional detection surface of an optical camera like a charge-coupled device (CCD) camera by using light detectable by the optical camera, especially visible light. This light projection image is preferentially generated while the interventional instrument is not within, for instance, a person. Thus, if the interventional instrument should be introduced into a person for performing an interventional procedure within the person, the light projection image is preferentially generated before introducing the interventional instrument into the person.

Although in above described embodiments the tracking device is adapted to determine the position and shape of the interventional instrument by OSS, in other embodiments the tracking device can be adapted to determine the position and shape of the interventional instrument by using another tracking technique like an electromagnetic (EM) tracking technique. In particular, several EM sensors may be arranged at least along a part of the interventional instrument, in order to determine the position and shape of at least this part of the interventional instrument. Preferentially, a non-image-based tracking technique like the OSS and/or the EM tracking technique is used.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the spatial transformation of the representation, the determination of a similarity measure, the determination of positions, at which the catheter is located, in the projection image based on the spatially transformed representation, et cetera performed by one or several units or devices can be performed by any other number of units or devices. The control of the positions determination apparatus in accordance with the positions determination method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a positions determination apparatus for determining positions, at which an interventional instrument like a catheter is located, in a projection image. An input unit allows a user to indicate the position of a tip of the interventional instrument in the projection image, wherein the positions, at which the interventional instrument is located, in the projection image are determined based on the projection image, the indicated tip position and a three-dimensional representation of the interventional instrument, which is defined by its position and shape as determined by a tracking device like an OSS device. By using the projection image, the indicated tip position and the representation the positions in the projection image, at which the interventional instrument is located, can be determined very accurately. Based on these determined positions the projection device and the tracking device can be very accurately registered to each other.

The invention claimed is:

1. A positions determination apparatus for determining positions, at which an interventional instrument is located, in a projection image, the positions determination apparatus comprising:
   a projection image providing unit for providing a projection image, which shows the interventional instrument and which has been generated by a projection device,
   a representation providing unit for providing a three-dimensional representation of the interventional instrument, which is defined by a position and shape of the interventional instrument as determined by a tracking device for tracking the location of the interventional instrument,
   an input unit for allowing a user to indicate the position of a tip of the interventional instrument in the projection image, and
   a positions determination unit for determining positions, at which the interventional instrument is located, in the projection image based on the provided projection image, the provided representation and the indicated position of the tip of the interventional instrument in the projection image, wherein the positions determination unit is adapted to
   spatially transform the representation such that a similarity measure, which depends on a deviation between a) a virtual projection of the spatially transformed representation on the detection surface of the detector and b) the interventional instrument in the projection image, is increased, wherein the spatial transformation includes a translation of the representation such that the tip of the virtual projection of the translated representation coincides with the indicated position of the tip of the interventional instrument in the projection image,
   determine curvature values along the virtually projected spatially transformed representation and to determine the positions, at which the interventional instrument is located, in the projection image based on the curvature values,
   divide the virtually projected spatially transformed representation into several segments,
   determine for each segment the largest curvature value, and
   determine the positions, at which the interventional instrument is located, in the projection image based on the positions of the respective largest curvature value determined for the respective segment.

2. The positions determination apparatus as defined in claim 1, wherein the spatial transformation includes a rotation of the translated representation such that the similarity measure is increased.

3. The positions determination apparatus as defined in claim 1,
   wherein the input unit is adapted to allow the user to indicate further positions of the interventional instrument in the projection image; and
   wherein the positions determination unit is adapted to determine positions, at which the interventional instrument is located, in the projection image based on the provided projection image, the provided representation, the indicated position of the tip of the interventional instrument in the projection image and the further positions indicated by the user.

4. The positions determination apparatus as defined in claim 3, wherein the positions determination unit is adapted to weight the contribution of the further positions indicated by the user to the determination of the positions, at which the interventional instrument is located, in the projection image, wherein the weighting depends on the number of the further positions indicated by the user.

5. The positions determination apparatus as defined in claim 1, further comprising:
   a registration unit for determining registration parameters defining a registration of the projection device with the tracking device based on the determined positions, at which the interventional instrument is located, in the projection image and the provided representation defined by the position and shape of the interventional instrument.

6. The positions determination apparatus as defined in claim 5, further comprising:
   a display for showing the projection image and markers representing the determined positions, at which the interventional instrument is located, in the projection image;
   wherein the input unit is adapted to allow the user to correct the determined positions; and
   wherein the registration unit is adapted to determine the registration parameters based on the corrected positions.

7. The positions determination apparatus as defined in claim 5,
   wherein the registration unit is adapted to apply the registration parameters to the projection image or the representation, in order to register the projection image and the representation to each other;
   wherein the positions determination apparatus further comprises a display for showing the projection image together with the representation and markers representing the determined positions, at which the interventional instrument is located, in the projection image;
   wherein the input unit is adapted to allow the user to modify the determined positions;

wherein the registration unit is adapted to update the registration parameters and the registration between the projection image and the representation based on the corrected positions; and wherein the display is adapted to show the projection image together with the representation of the interventional instrument in accordance with the updated registration and markers representing the modified positions.

8. The positions determination apparatus as defined in claim 5, wherein the registration unit is adapted to apply the registration parameters to a projection image provided by the projection image providing unit and/or a representation provided by the representation providing unit, in order to register the projection image and the representation to each other; and wherein the positions determination apparatus further comprises a display for showing the projection image together with the registered representation.

9. An interventional system, comprising:

an interventional instrument for carrying out an interventional procedure within a subject, and a positions determination apparatus as defined in claim 1 for showing a projection image, which shows the subject, together with a registered representation of the interventional instrument.

10. A positions determination method for determining positions, at which an interventional instrument is located, in a projection image showing the interventional instrument, the positions determination method comprising:

providing a projection image, which shows the interventional instrument and which has been generated by a projection device, by a projection image providing unit, providing a three-dimensional representation of the interventional instrument, which is defined by a position and shape of the interventional instrument as determined by a tracking device for tracking the location of the interventional instrument, by a representation providing unit, allowing a user to indicate the position of a tip of the interventional instrument in the projection image by an input unit, and determining positions, at which the interventional instrument is located, in the projection image based on the provided projection image, the provided representation and the indicated position of the tip of the interventional instrument in the projection image by a positions determination unit, wherein the determining positions, at which the interventional instrument is located, includes spatially transforming the representation such that a similarity measure, which depends on a deviation between a) a virtual projection of the spatially transformed representation on the detection surface of the detector and b) the interventional instrument in the projection image, is increased, wherein the spatial transformation includes a translation of the representation such that the tip of the virtual projection of the translated representation coincides with the indicated position of the tip of the interventional instrument in the projection image, determining curvature values along the virtually projected spatially transformed representation and to determine the positions, at which the interventional instrument is located, in the projection image based on the curvature values, dividing the virtually projected spatially transformed representation into several segments, determining for each segment the largest curvature value, and determining the positions, at which the interventional instrument is located, in the projection image based on the positions of the respective largest curvature value determined for the respective segment.

11. A non-transitory computer program for determining positions, at which an interventional instrument is located, in a projection image showing the interventional instrument, the non-transitory computer program comprising program code means for causing a positions determination apparatus as defined in claim 1 to carry out the steps of the positions determination method, when the non-transitory computer program is run on a computer controlling the positions determination apparatus.

* * * * *